Jan. 1, 1952    L. PAVELLE    2,581,136
PROJECTION PRINTER

Filed Nov. 3, 1948    6 Sheets-Sheet 1

INVENTOR
LEO PAVELLE
BY
John E. Hubbell
ATTORNEY

Jan. 1, 1952     L. PAVELLE     2,581,136
PROJECTION PRINTER
Filed Nov. 3, 1948     6 Sheets-Sheet 2
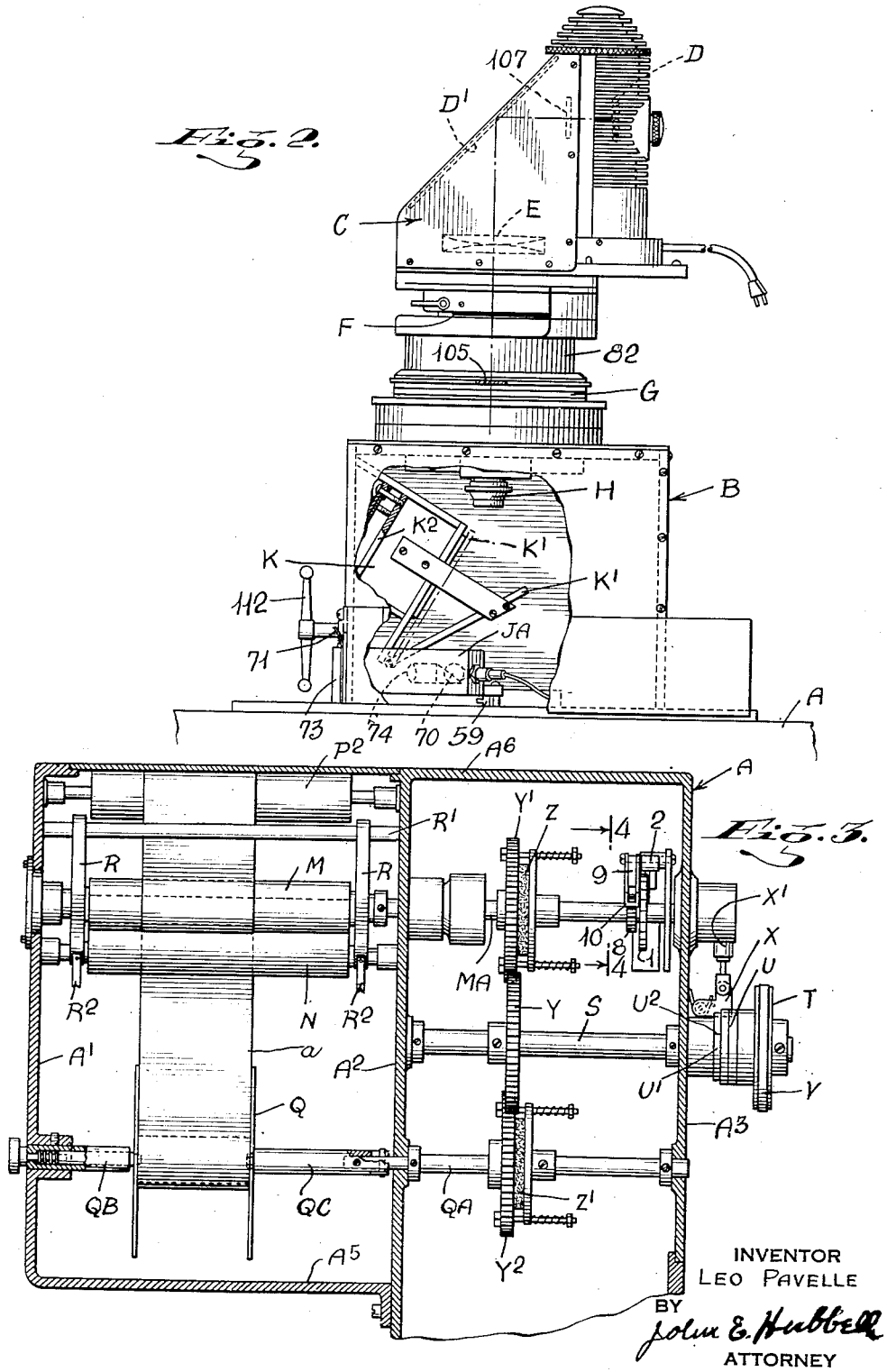
INVENTOR
LEO PAVELLE
BY
John E. Hubbell
ATTORNEY

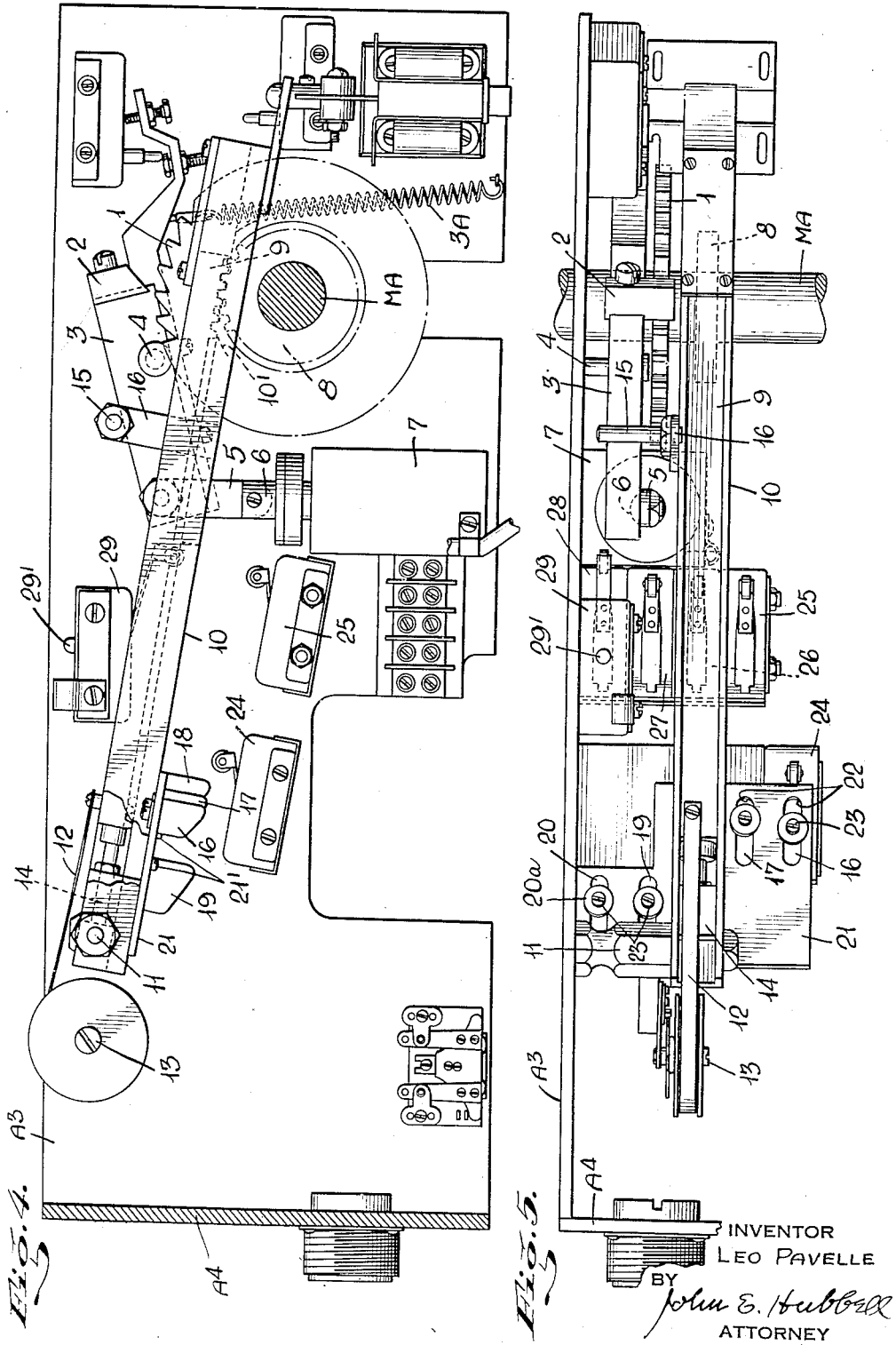

Jan. 1, 1952 L. PAVELLE 2,581,136
PROJECTION PRINTER
Filed Nov. 3, 1948 6 Sheets-Sheet 4
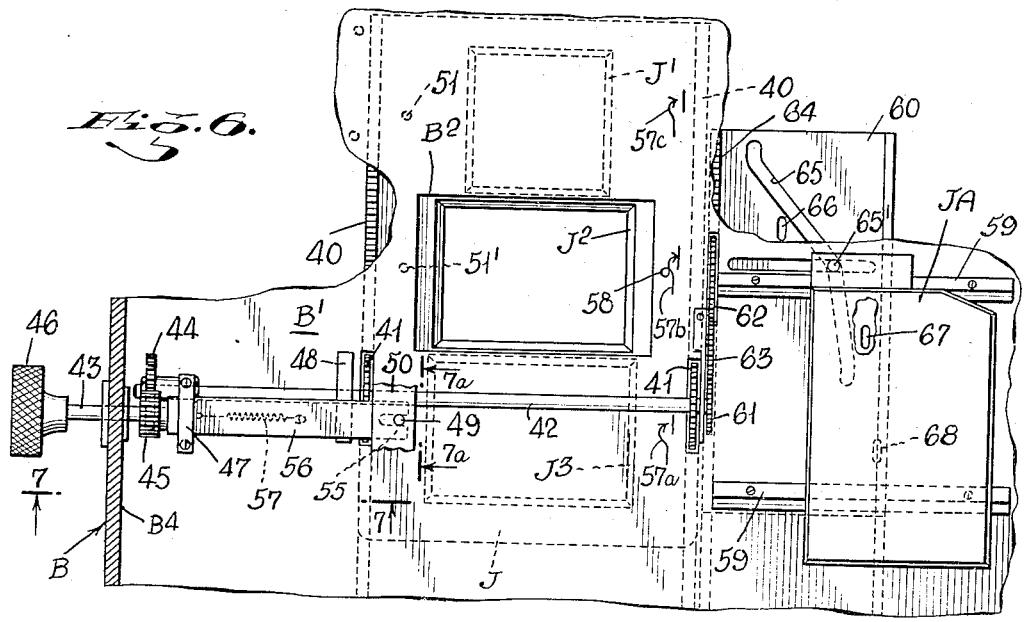
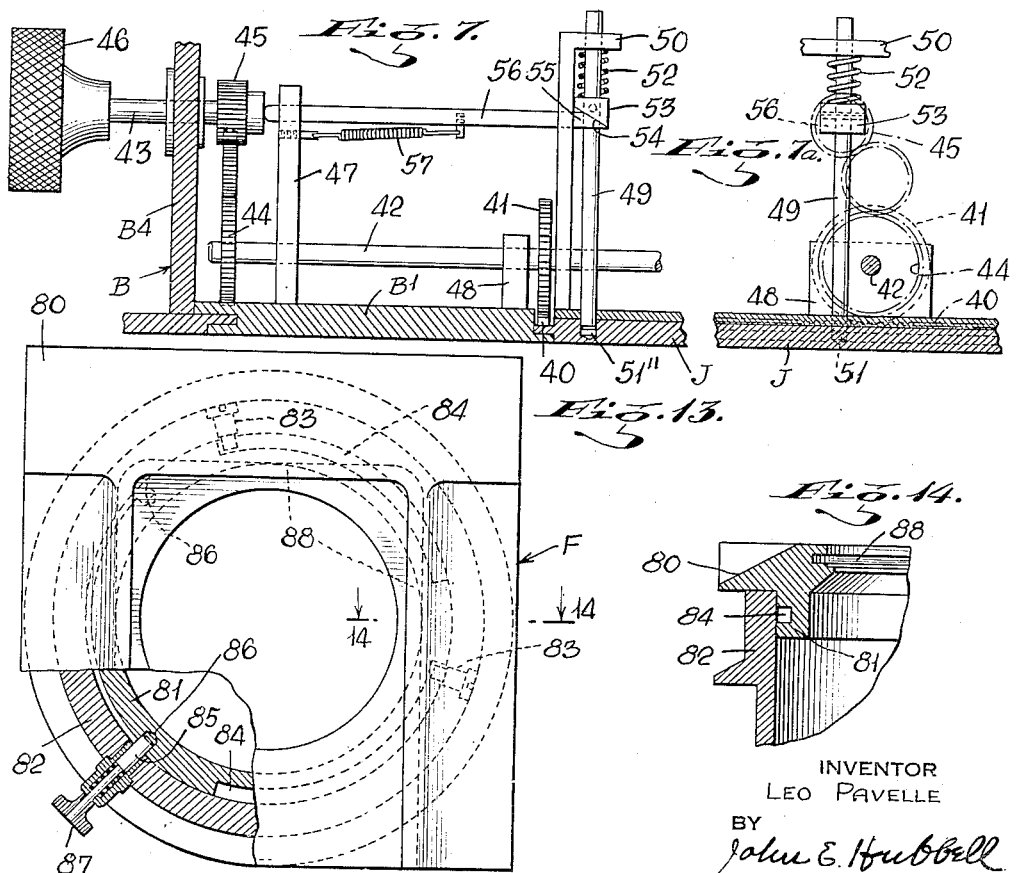
INVENTOR
LEO PAVELLE
BY
John E. Hubbell
ATTORNEY

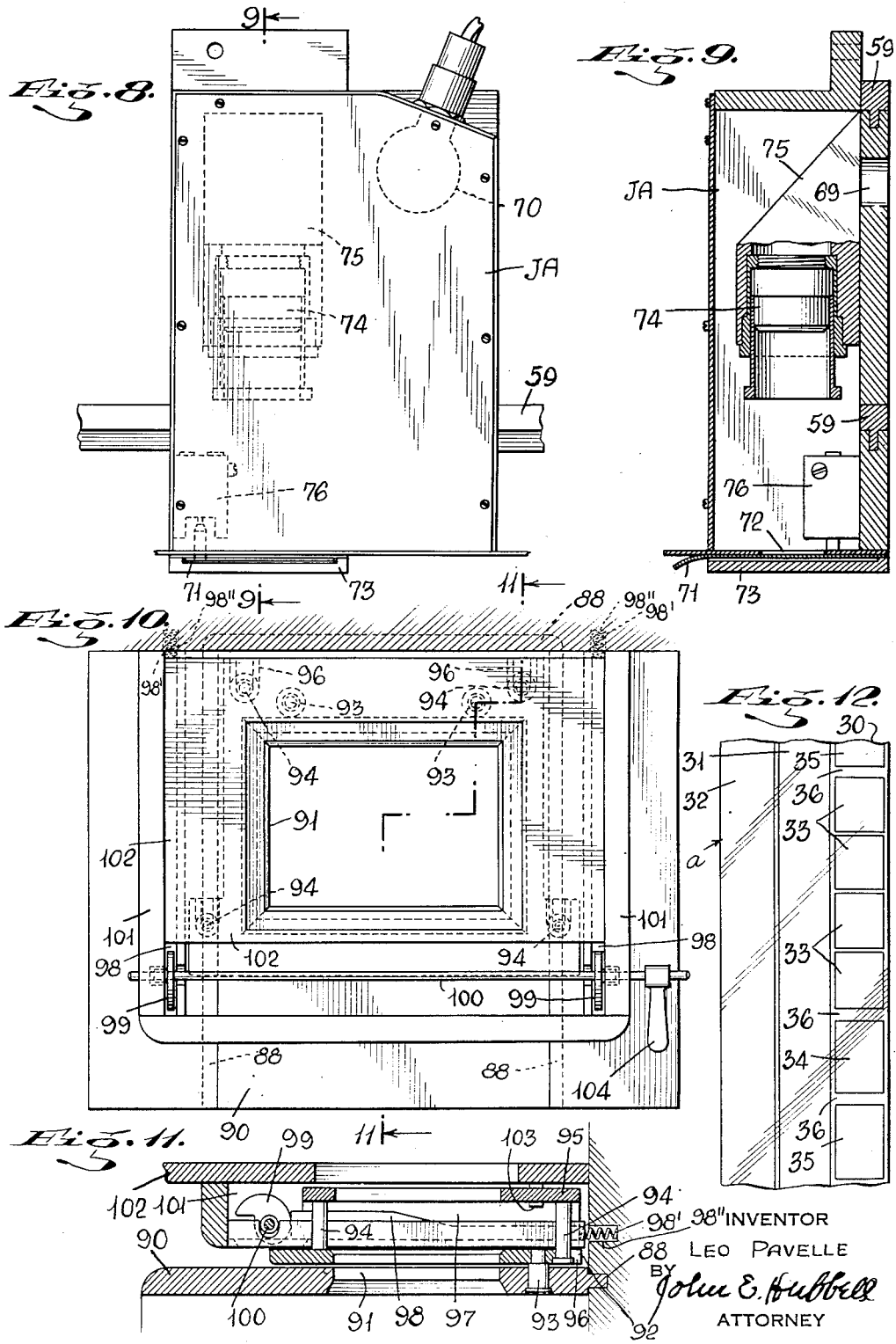

Jan. 1, 1952  L. PAVELLE  2,581,136
PROJECTION PRINTER

Filed Nov. 3, 1948  6 Sheets-Sheet 6

INVENTOR
LEO PAVELLE
BY
John E. Hubbell
ATTORNEY

Patented Jan. 1, 1952

2,581,136

UNITED STATES PATENT OFFICE 2,581,136

PROJECTION PRINTER

Leo Pavelle, Mount Vernon, N. Y., assignor to Pavelle Color Incorporated, New York, N. Y., a corporation of Delaware Application November 3, 1948, Serial No. 58,089

19 Claims. (Cl. 88—24)

The general object of the present invention is to provide an improved optical projection printer adapted for use in printing pictures on successive sections of a flexible strip of suitable sensitized photographic material by projecting light through a transparent picture. The latter may be in the form of a negative or positive, or it may be a transparency of some other form. The invention is also adapted for use in a form in which the printing light is reflected to the sensitized material from the picture being produced, and in such case the picture may be opaque. The invention was primarily devised for use in printing color pictures from color negative and positive transparencies.

A specific object of the present invention is to provide improvements in the optical projection printer disclosed and claimed in my prior application, Serial No. 614,628 filed September 6, 1945, which are adapted to extend the field of use of projection printers of the general type disclosed and claimed in my prior application. A still more specific object of the invention is to provide a projection printer which is adjustable for use in the rapid production of pictures varying in size and shape on a strip of photographic material of predetermined width. To this end, it is an object of the invention to provide means for feeding successive sections of the strip material successively through a printing position in such manner that the lengths of the material sections successively moved through the printing position may be readily varied as required for the printing of pictures of different sizes without undue wastage of the strip photographic material.

Another specific object of the invention is to provide simple and effective means for printing a separate longitudinal series of pictures on each of separate side by side longitudinal sections of an elongated strip of printing material, by printing the picture on each of said sections successively, and by printing the series of pictures on each section before or after printing the series of pictures on each other section of the printing material. To facilitate the successive printing of the side by side series of pictures, my improved printer advantageously includes means for rewinding the strip printing material after printing one series of pictures and prior to printing another series of pictures on the same strip of printing material.

Another object of the invention is to provide a projection printer with improved means for printing an order number or other picture identifying data on the printing material in suitably spaced relation to the different pictures printed.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawings:

Fig. 2 is a side elevation partly broken away and in section of the upper projector head portion of the printer shown in Fig. 1;

Fig. 3 is a partial sectional elevation taken on the broken line 3—3 of Fig. 1;

Fig. 4 is a partial section taken on the line 4—4 of Fig. 3;

Fig. 5 is a plan view of the apparatus shown in Fig. 4;

Fig. 6 is a somewhat diagrammatic plan view of the mask plate and number printer and their adjusting means;

Fig. 7 is a partial section on the line 7—7 of Fig. 6;

Fig. 7a is a partial section on the line 7a—7a of Fig. 6.

Fig. 8 shows the layout of the number printing box.

Fig. 9 is a section on the line 9—9 of Fig. 8;

Fig. 10 is a plan view of transparency supporting means;

Fig. 11 is a section on the line 11—11 of Fig. 10;

Fig. 12 is a diagrammatic view showing a partially exposed strip of photographic material;

Fig. 13 is a plan view of a portion of the housing structure directly beneath the transparency holder.

Fig. 14 is a partial section on the line 14—14 of Fig. 13, and

Figure 1:
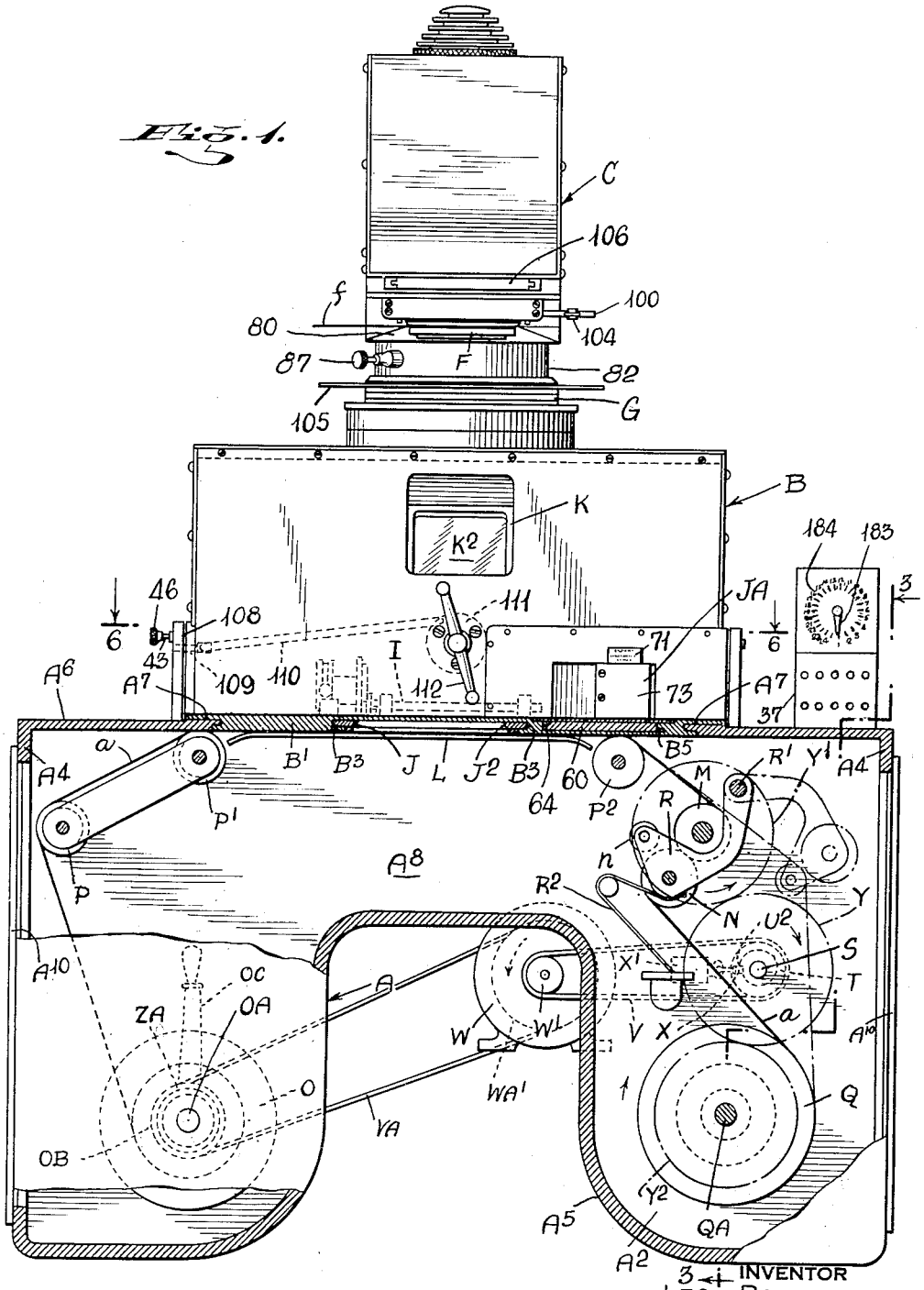
Fig. 1 is a somewhat diagrammatic elevation, partly in section, of my improved printer.

The optical projection printer illustrated in the drawings comprises a housing structure or framework including a lower or base section A, an intermediate section B and an upper projection head section C. The section B is above and supported by the base section A, and is bodily adjustable, relative to the latter, in horizontal direction perpendicular to the elevation plane of Fig. 1. The section C is above and supported by the section B, and is adjustable relative to the section B both vertically and angularly about a vertical axis in a manner and for purposes hereinafter described. The section A, as shown, comprises parallel vertical walls A', A² and A³, side walls A⁴ transverse to the walls A', A² and A³, a bottom wall A⁵ and a top wall A⁶. The top wall is partly cut away to form a tongue and groove guideway A⁷ in which the bottom wall B' of the section B is mounted for its movements in a horizontal direction. The walls A', A², A⁴, A⁵ and A⁶ and section B enclose a light proof chamber A⁸ containing mechanism for supporting and giving longitudinal movement to an elongated strip $a$ of flexible sensitized paper or other photographic printing material.

The projector head section C encloses and supports an optical system including a lamp D adjacent the top of the structure, a mirror D' receiving light passing horizontally to it from the lamp D, and inclined to reflect the light downward, so that the light passes successively through a condensing lens E, a transparent picture $f$ held in a support F, a focusing section G including a projection lens in an adjustable mount H, through a shutter I when the latter is open and thence through an exposure orifice B² in the bottom wall B' and a registering aperture J² in a mask plate J, to the portion of the printing material $a$ directly beneath said aperture. As shown, a viewer K is mounted in the lower portion of the upper housing section B so as to be normally out of the path of the beam of light passing to the shutter from the lens H, but including a mirror K' which is pivoted to turn between positions shown in full and in dotted lines in Fig. 2. When in its full line position, the mirror K' intercepts the light rays passing downward from the lens H and reflects an image of the transparent picture $f$ onto a frosted glass window K² transverse to the open ended casing body of the viewer. The image thus reflected onto the frosted glass K², can then be seen from outside of the printer structure. When the mirror K' is turned into its dotted line position, it prevents the passage of light into the housing section B through the viewer. The mirror K' may be manually adjusted into its full line position shown in Fig. 2, and may be maintained in the last mentioned position in any convenient manner.

As is hereinafter explained, in normal operation the strip of printing material $a$ is intermittently advanced to successively move successive longitudinal sections of the strip through an exposure position. Each of said strip sections, when in the exposure position, is directly beneath one or another of three apertures, J', J² and J³ in a mask plate J. The mask plate J is mounted for horizontal adjustment in a direction transverse to the movement of said sections through the exposure position in an undercut guideway B³ formed in the lower portion of the bottom wall B' of the housing section. The mask plate J is associated with a number printer box JA which is given adjustments simultaneously with and proportional to the adjustments given the mask plate J, as is hereinafter explained.

The adjustments of the housing section B in the guideway A⁷ of the base section A serve to bring the exposure orifice B², and all portions of the light projecting apparatus above that orifice into operative relation with the desired one of the three side by side longitudinal portions 30, 31 and 32 of the sensitized material strip $a$ shown in Fig. 12, to adapt the apparatus for printing pictures on said longitudinal portion. Each adjustment of the mask plate J in the guideway B³ brings a particular one of its apertures J', J² or J³ into register with the exposure B², and thus determines size and shape of the next picture reproduced. Normally, the adjustment of the section B in the guideway A⁷ is effected only preparatory to the printing of a row of pictures on a particular one of the longitudinal film portions 30, 31 and 32, but adjustment of the mask plate J in the guideway B³ is effected as often as the sizes of successively printed pictures differ.

In normal operation the strip of printing material $a$ is periodically advanced to successively move successive longitudinal sections of the strip through an exposure position in which the section to be exposed next is directly beneath the mask plate apertures J' J² or J³ then in register with the orifice B², and is directly above a platen, or printing material guide L. The guide L is spaced from the underside of the mask plate by a distance just great enough to accommodate the movement of the strip material $a$. As shown, the material $a$ is intermittently advanced by an intermittently rotated measuring roll M against which the strip material is snugly held by a pressure roll N. The latter thus prevents the strip from slipping over the roll M, which is the active strip feeding element. The measuring roll M draws the strip $a$ from a feed spool O over guiderolls P and P' at one end of the channel between the mask plate J and platen L and over a guide roll P² at the opposite end of said channel. The strip material $a$ normally passes from the guide roll P² downward into contact with the roll M and thence about the lower side of the roll M and upward between the rolls M and N, and around the upper portion of the latter and thence downward to a take-up spool Q. The rolls M and N customarily comprise metallic shaft or body portions and peripheral portions formed of rubber or analogous yielding material which surround and are secured to the corresponding shaft portions.

The pressure roll N has a shaft extension at each end journalled in the corresponding one of a pair of links or rocker arms R. The arms R have their other ends pivotally connected one to one and the other to the second of the framework walls A' and A² as by means of a common pivot shaft. The arms R thus unite with the roll N to form a rocker frame biased by a spring R² for turning movement into its normal position shown in full lines in Fig. 1. In said normal position, the pressure roll N is at the left of the measuring roll M, as seen in Fig. 1, and presses the strip $a$ firmly against the roll M so as to prevent slippage of the material $a$ relative to the roll M. The rocker arms R also support a roll $n$ laterally displaced from the roll N and at the left side of and out of engagement with the material $a$ when in its position shown in Fig. 1. When the rocker frame is moved counter-clockwise from its normal position shown in full lines in Fig. 1 into its position shown in dotted lines in that figure, the pressure roll N is moving out of contact with the measuring roll M and out of contact with the strip material $a$ passing between the guide roll P² and the take-up roll Q. In the final portion of the counter-clockwise movement of the pressure roll N, the guide roll $n$ engages the left side of the strip $a$ and deflects said strip away from the roll M into its position shown in dotted lines in Fig. 1. Such movement of the strip out of engagement with the measuring roll is effected to facilitate rewinding operations hereinafter referred to, without requiring provisions for turning the measuring roll backward.

As shown in Fig. 3, the take-up spool Q is detachably connected to its driving shaft QA and the measuring roll M may be similarly connected to its driving shaft MA. Each of the shafts QA and MA has one end extending through and journalled in the frame wall $A^2$, and has its other end journalled in the frame wall $A^3$. An intermittently rotating main driving shaft S is journalled in the walls $A^2$ and $A^3$ and extends through the latter. The shaft S supports a pulley T and a single revolution clutch U. The pulley T is connected by a belt V to a driving pulley W' carried by the shaft of a motor W. The latter is normally in continuous rotation. The single revolution clutch U may be of well known type and form, and is adapted to positively clutch the pulley T to the shaft S to effect one revolution of the latter whenever an annular clutch part U' is free to rotate, but when the rotation of the clutch part U' is prevented, the clutch permits the pulley T to then turn freely on said shaft S.

As shown, a locking member X normally holds the clutch member U' stationary and thus prevents the rotation of the drive shaft S through the pulley T and clutch U. The locking member X is in the form of a pivoted pawl or detent biased for movement into the position in which it engages a locking shoulder $U^2$ carried by the member U' and prevents rotation of the latter. An electromagnetic relay X' is momentarily energized to retract the locking member X at the beginning of each feeding movement given the photographic material strip $a$. The retraction of the locking member X releases the member U' so that the clutch U then effects a single revolution of the shaft S. The relay X' is shown as having its movable armature connected to the pawl X by a link. The single revolution clutch U need not be further illustrated or described since it may be of well known type and form, and, for example, may be identical with the single revolution clutch disclosed and similarly used in my above-mentioned prior application. At the end of each revolution of the shaft S, the locking element X reengages the shoulder $U^2$ of the member U' and thus disconnects the pulley T from the shaft S.

A spur gear Y, mounted on and rigidly connected to the main shaft S, meshes with and drives a spur gear Y' mounted on the measuring roll shaft extension MA, and meshes with and drives a spur gear $Y^2$ mounted on the extension shaft QA of the take-up spool Q. The spur gear Y' drives the shaft MA and thereby rotates the measuring roll M in the strip feeding direction through a friction clutch Z, when the shaft MA is not positively held against rotation in the feeding direction. Similarly, the gear $Y^2$ rotates the shaft QA through a friction clutch Z', except when the rotation of the latter is prevented by the tension of the material $a$, created when the rotation of the shaft MA is positively arrested while the gear Y' is still in rotation. The strip material $a$ passing from the spool O to the measuring roll M is maintained under suitable tension by a retarding element ZA which may be a friction clutch arranged to subject the feed spool O to a suitable braking force.

In respect to the features of construction and arrangement referred to in detail hereinbefore, the projection printer disclosed herein does not differ significantly in its general construction and mode of operation from the printer shown and described in my above mentioned prior application, except that said prior application discloses no means like, or analogous to the above described means for moving the pressure roll N out of, and the guide roll $n$ into engagement with the strip material $a$ to facilitate the rewinding of said material. The apparatus disclosed herein is also like the apparatus disclosed in said prior application in that the light proof chamber $A^8$ in which the supply and take-up rolls O and Q are mounted, is formed with doors $A^{10}$ to facilitate the replacement of an empty supply spool O and a full take-up spool Q by a full supply spool and an empty take-up spool, respectively, on suitable adjustments of the axially adjustable spool engaging elements OA and QA extending through the housing wall A'. The apparatus disclosed herein is preferably like that disclosed in the prior application in that it is arranged for the ready interchangeable use of spool supporting spindles of different lengths, to accommodate the use of spools O and Q of different axial length and adapted to hold printing material strips of different widths. The printer disclosed herein may thus permit the rapid and easy replacement of a filled take-up spool, and of an empty supply spool whenever necessary, and without interruption in the normal illumination of the room or space in which the printer is installed.

The projection printer disclosed and claimed herein differs importantly from the printer disclosed in my prior application in the character of its mechanism for initiating and interrupting the angular feeding movements intermittently given the measuring roll M; and by its inclusion of means for bodily adjusting the projection head relative to the strip of sensitized paper or photographic material on which the pictures are printed, so that a plurality of side by side longitudinal rows of pictures are formed on said strip; and in the character of its means for printing an order number or other picture identifying symbol or data on the photographic material between successively printed dissimilar pictures; and by its mechanism for varying the size and shape of the pictures successively printed on the photographic material. The last mentioned mechanism comprises the previously mentioned mask plate J, and means for adjusting it to selectively position one or another of its differently sized apertures J', $J^2$ and $J^3$ in register with the printing light path. Said mechanism also includes means for angularly adjusting the holder F for the picture being reproduced about the optical axis of the printer through an angle of 90°, and means for varying the picture reproduction or enlargement scale.

In each rewinding operation, film $a$ previously wound on the take-up spool Q is unwound from the latter and rewound on the supply spool O by means shown as comprising a normally inoperative driving connection between the motor W and spool O. As diagrammatically shown in Fig. 1, said driving connection comprises a belt VA running about a drive pulley WA' carried by the shaft of the motor W and about a pulley OB mounted on the supply spool shaft OA. Normally, the pulley OB is loose on the shaft OA, but by adjustment of a clutch lever OC, a friction clutch connection between the pulley OB and shaft OA may be established preparatory to each rewinding operation. The adjustment of the clutch lever OC in the direction to operatively couple the pulley OB to the shaft OA may serve to disconnect the retarding element ZA from the spool O thereby eliminating the normal braking action of the elements ZA. At the end of each rewinding operation, the clutch lever OC is given a reverse adjustment to operatively disconnect the pulley OB from the shaft O and to gain connect the retarding element ZA to the spool O.

In accordance with the present invention, the extent of each angular movement given the shaft MA is restricted and controlled by means comprising a ratchet wheel 1 secured to the shaft MA and a locking detent 2 carried at one end of a lever 3 journalled to turn about a horizontal shaft or pivot pin 4 secured in the frame plate A³ and parallel to and above and somewhat to the left of the shaft MA as seen in Fig. 4. The end of the lever 3 remote from the detent 2 is connected by a depending link 5 to the upper end of the armature or core 6 of a vertically disposed solenoid relay 7. The lever 3 is biased by a spring 3A for movement about the pivot 4 to move the detent down into position to engage an adjacent tooth of the ratchet wheel 1, and hold the latter against rotation in the direction in which the measuring roll M turns in moving strip material $a$ away from the supply O and to the take-up spool Q. The movement of the detent 2 into engagement with the wheel 1 can occur only when the relay 7 is deenergized and its armature 6 is elevated through the lever 3 by the bias spring 3A. When the relay 7 is energized, the armature 6 moves downward and tilts the lever 3 and thereby moves the detent 2 up out of engagement with the ratchet wheel 1. As is hereinafter explained, the energization of the relay 7 is attended by the energization of the relay X' and the rotation of shaft S. In consequence, the energization of the relay 7 initiates a rotating movement of the shaft MA and that movement continues until the relay 7 is deenergized.

In the contemplated operation of the apparatus, the deenergization of the relay 7 follows its energization by a time interval which may be varied, but is always shorter than the time required for the completion of a single revolution of the shaft MA. The means controlling the duration of each period during which the detent 2 is disengaged from the ratchet wheel 1 and the latter is free to rotate, comprises a spur gear 8 carried by the shaft MA alongside the ratchet wheel 1, and a rack bar 9. The latter is generally horizontal and extends transversely to the shaft MA above the gear 8, and is biased for down movement into position in which its teeth mesh with the teeth of the gear 8. While the solenoid 7 is deenergized, the bar 9 is held above and out of contact with the gear 8, but when said solenoid is energized, the rack bar 9 moves downward into the position in which its teeth mesh with the teeth of the gear 8. The rack bar 9 is supported by, and is longitudinally movable in an elongated support 10 of channel bar cross section. The end of the support 10 remote from the gear 8 is pivotally connected to the framework plate A³ by a pivot or stud 11 anchored in the framework. The pivot 11 is parallel to the shaft MA and is displaced to the left of the latter, as seen in Fig. 4. The base portion or bottom wall of the support 10 is cut away at 10' directly above the gear wheel 8 to permit the rack bar teeth to move into mesh with the teeth of the gear 8 when the relay 7 is energized. Except where the base portion or bottom wall of the support 10 is cut away, the rack gear teeth formed at the underside of the rack bar 9 rest upon said base portion or bottom wall. The end of the rack bar 9 adjacent the pivot 11 is connected to the otherwise free end of a spiral return spring 12. The latter is coiled about and has its inner end attached to a supporting shaft 13 rigidly connected to the printer framework. The spring 12 tends to hold the adjacent end of the rack bar 9 in engagement with an abutment block 14 anchored in the channel bar 10.

As shown, the deenergization of the relay 7 permits the rack bar 9 to be moved out of engagement with the gear 8 in consequence of the fact that a horizontal pin 15 having one end connected through an arm 16 to the rack bar support 10, extends over the arm of the lever 3 to which the armature of the solenoid 7 is connected. When the solenoid 7 is deenergized, the lever 3 is tilted by the bias spring 3A into engagement with the pin 15, and this raises the support 10 and thereby moves the rack bar 9 out of engagement with the gear 8. When the relay 7 is energized, the lever 3 is thereby tilted into the position in which it permits the down movement of the support 10 which continues until the teeth of the rack bar 9 engage the gear 8. The energization of the relay 7 which permits the teeth of the rack bar 9 to move into mesh with the teeth of the gear 8 and also moves the detent 2 out of engagement with the ratchet wheel 1, is attended, as noted above, by the energization of the relay X' and thus initiates a rotation of the measuring roll MA.

The rotation of the shaft MA operates through the gear 8 to move the rack bar 9 to the right, as seen in Fig. 4. Each such rack bar movement continues until it effects the deenergization of the relay 7 by its actuation of one or another element of a switching mechanism associated with the rack bar. As hereinafter explained, the extent of longitudinal movement given the rack bar 9 following each energization of the relay 7, may be equal to any one of five different fixed, though adjustable, distances, which are selectively predetermined by the conditions of operation, as hereinafter explained. Said switching mechanism associated with the rack bar 9 comprises switch actuating members 16, 17, 18, 19, 20 and 20a, carried by the rack bar 9. As shown, said members are adjustably secured to a plate 21. The latter is secured to the rack bar 9 as by means of a clamping bolt or bolts 21' extending through a slot in the bottom wall of the rack bar carrier and guide 10, adjacent its supporting pivot 11. As shown, the plate 21 is formed with a separate slot 22, elongated in the direction of the length of the rack bar, for each of the switch actuators 16, 17, 18, 19 and 20, and each such actuator has a threaded stem 23 extending through the corresponding slot 22 and provided with a clamping nut for releasably securing the actuator of the plate 21.

The actuators 16, 17, 18, 19 and 20 are arranged to respectively engage and actuate switches 24, 25, 26, 27 and 28 in the order stated, when the extent of movement given the rack bar 9 permits. In addition, the clamping nut 20a on the stem 23 of actuator 20 engages and actuates a limit or safety switch 29 after a movement of the rack bar 9 exceeds the normal extent of such movement, and results from the failure of the appropriate one of switches 24—28 to interrupt the rack bar movement. Which one of those switches should interrupt any particular rack bar movement is automatically determined by control circuit adjustments varying with and dependent on operating conditions, as is fully explained hereinafter. The extent of movement of the rack bar 9 away from its initial position required to actuate any particular one of the switches, is dependent upon the normally fixed position of that switch, and on the adjustment of the corresponding switch actuator relative to its supporting plate 21. In normal operation, each movement of the rack bar 9 away from its initial position is interrupted by the actuation of a particular one of the switches 24, 26, 27 and 28.

At this point, I note, however, that the operative purpose of the switch 24 is to effect the limited advancements of the film strip $a$ which provide film sections on which may be printed an order number or other identifying legend for a picture to be printed on an adjacent portion of the film $a$, and that the switches 25, 26, and 27 are employed to proportion film advancing movements to the respective sizes of the pictures to be printed on the film portions advanced. As previously noted, the particular form of apparatus illustrated by way of example, is adapted to print a row of pictures on one longitudinal portion of the film $a$ and thereafter to print a row of pictures on a second longitudinal strip of the film and to print a row of pictures on a third longitudinal section of the film. The three side by side longitudinal film sections are designated 30, 31 and 32 in Fig. 12. The reference symbols 33, 34 and 35 designate the sections of the film strip 30 on which pictures of relatively small, intermediate and large sizes are respectively printed. In Fig. 12, the symbol 36 designates film sections on each of which may be printed an order number or other identifying legend for a picture printed on the section of the film immediately behind the section 36. Thus, in Fig. 12, the legend printed on the lowermost section 36 identifies the picture printed on the adjacent film section 34, and the section 36 between the adjacent sections 33 and 34 has printed on it the identification legend for the adjacent picture 33, and on the uppermost space 36 is printed the identifying legend for the picture printed on the adjacent section 35.

As shown in Fig. 12, there are four adjacent sections 33, on each of which a small size picture is printed, following the film section 36 between the film section 34 and the four film sections 33.

The size of any particular picture printed, or more accurately the size of the portion 33, 34, or 35 of the film $a$ on which the picture is printed, depends on the adjustment of the mask plate J. As is shown collectively by Figs. 1 and 6, the mask plate J is formed with three exposure apertures J', J² and J³ arranged in a row. The middle aperture J² is smaller than the aperture J³ at one end of the row and is larger than the aperture J' at the opposite end of the row. The precise form and dimensions of the apertures J', J² and J³ may be varied as conditions make desirable. However, by way of illustration and example, it is noted that in one embodiment of the invention, apertures J', J² and J³ are respectively proportioned for the printing of pictures having the respective dimensions of 3 inches by 3 inches, 3 inches by $4\frac{1}{16}$ inches, and 3 inches by $4\frac{1}{4}$ inches. Each picture printed is surrounded by a margin ¼ of an inch wide, and each section 36 in which an identifying legent is printed includes a legend space $\frac{3}{16}$ of an inch wide.

The mask plate J is mounted in the previously mentioned guideway B³ in the bottom wall B' of section B, for movement in a direction at right angles to the direction of film travel past the mask plate. In the intermediate position of the mask plate J in the guideway B³, shown in Fig. 6, the mask plate aperture J² is in line with the optical axis of the printer and is in register with the exposure orifice B³ in the wall B', which is closed and opened by the shutter mechanism I. A movement of the mask plate away from its intermediate position in one direction brings the small mask aperture J' into register with the orifice B³, and a movement of the mask plate in the opposite direction brings the large aperture J³ into register with said orifice.

A series of similar pictures may be printed on successive sections of the film such as the four sections 34 shown in Fig. 12, in the course of a series printing operation, by a series printing mechanism which may be of the general type and form disclosed in my prior application. As shown herein, each such series printing operation involves a film advancing movement to provide a film section 36 on which may be printed an identifying legend for the group of series printed pictures; the advancement of the film to provide the film section 34 for the first picture of the series; the exposure of that film section and the previously advanced section 36; and the subsequent alternate advancement and exposure of the various film sections 34 on which the remainder of the pictures of the series are printed. Except for the initial advancement of a film section 36, the series of series printing steps just described are effected automatically. Most of the features of the series printing mechanism of the printer shown, are identical with those disclosed in my said prior application and need not be disclosed in detail herein. However, the prior application does not comprise the means including the switch 24 disclosed herein for effecting a film advancing movement providing a picture identifying film section 36, preparatory to each picture printing operation, and does not comprise the switch 28 and means hereinafter described, for preventing the switch 24 from terminating more than one film advancing movement during each series printing operation.

Figure 15:
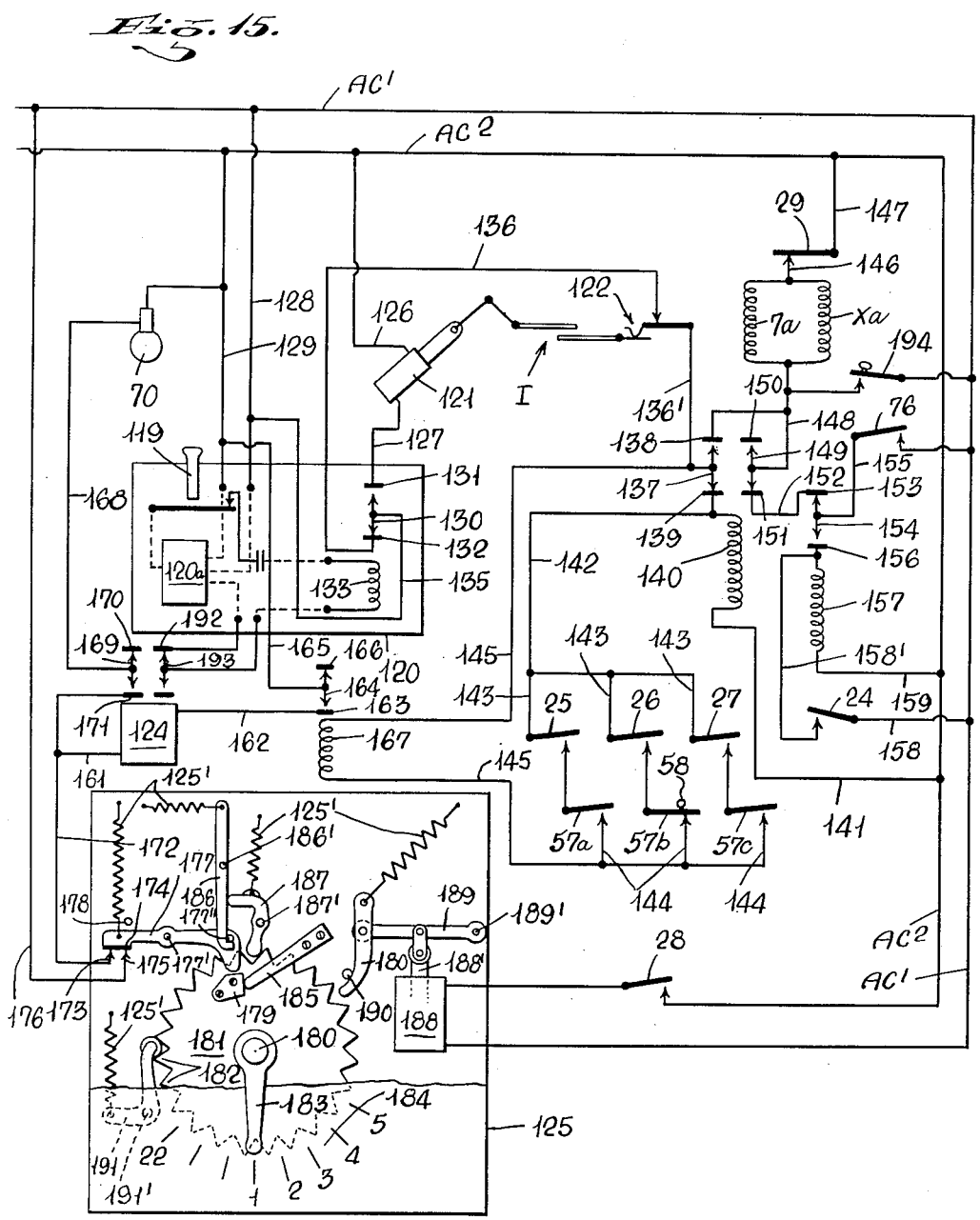
Fig. 15 is a circuit diagram including circuit connections to switches shown in Fig. 4.

In the apparatus disclosed herein, a series printing operation is initiated, and the number of pictures to be printed is selected by the adjustment manually or by push button control, of series printing selector 183 shown on an operator's control panel 38 shown diagrammatically in Fig. 15 and shown in Fig. 1 as mounted on an operator's control panel 37 to a position along a scale 184 which indicates the number of pictures to be printed. The maximum number of pictures which can be printed in any series printing operation depends on the design of the series printing apparatus. In the arrangement shown in Figs. 1 and 15, the number of pictures printed in each series printing operation may be any number between 2 and 22, inclusive.

The means by which the mask plate J is longitudinally adjusted may take various forms. As shown in Figs. 6 and 7, the mask plate J is provided at each of its longitudinal sides with a corresponding rack bar 40 having teeth at its upper side in mesh with the teeth of spur gears 41 carried by a horizontal shaft 42. The latter extends transversely to the direction of movement of the mask plate. At its left end, as seen in Fig. 6, the shaft 42 is connected to a manually rotatable adjusting shaft 43 by gearing comprising a spur gear 44 carried by the shaft 42 and an elongated spur gear 45 secured to the shaft 43. The latter extends through and outwardly away from the corresponding side wall of the housing body B, and at its outer end carries a knob 46 through which the shaft 43, and thereby the shaft 42, can be rotated as required to bring any desired one of the mask apertures J', J$^2$ and J$^3$ into register with the aperture B$^2$.

The shaft 42 is journalled in posts or brackets 47 and 48 extending upward from the bottom wall B' and the shaft 43 is journalled and longitudinally movable in a side wall portion B$^4$ of the section B. To insure that the mark plate J is properly positioned longitudinally of the guideway B$^3$ in each printing operation, means are advantageously provided for detachably locking the mask plate J to the bottom wall B' of the section B. The locking means shown comprises a vertical locking pin 49 which has its lower end extending through an opening in the portion of the bottom wall B' above the guideway B$^3$ and has its upper end passing through a guide opening formed in the horizontal upper portion of an uprising post or bracket 50 carried by the bottom wall B'. The mask plate is formed with three sockets 51, 51' and 51' and 51'' so positioned that the locking pin can enter the socket 51 only when the mask aperture J$^2$ is in register with the bottom wall aperture B$^2$, and can enter the sockets 51' or 51'' only when one or the other of the mask plate apertures J' or J$^3$ is respectively in register with the opening B$^2$. The locking pin 49 is biased for down movement by a spring 52 and is provided with a collar 53 formed with a cam surface 54. The locking pin can be raised to lift its lower end above the level of the tops of the sockets 51, 51' and 51'' by the adjustment of the wedge end 55 of a bar 56. The latter is in abutting relation with the shaft 43. A bias spring 57 normally holds the cam bar 56 out of the position in which its wedge end 55 interferes with movement of the locking pin 49 into a subjacent socket. The cam bar 56 can be moved longitudinally against the tension of the spring by longitudinal movement of the shaft 43 into the position in which it holds the locking pin in an elevated position.

As previously stated, the longitudinal adjustments of the member J effect corresponding adjustments of a number printing box JA. The latter is mounted on the bottom wall B' by means of guides 59 attached to and supported by the wall B'. The bottom wall of the box JA and the guides 59 are relatively arranged to form a tongue and grooved connection between the wall B' and box JA for movement of the latter in a direction transverse to the direction of movement of the mask plate J. The box JA is given such movement by a cam plate 60 mounted in a grooved guideway B$^5$ formed in the bottom wall B' of the intermediate section B of the printer alongside the mask plate guideway B$^3$. The cam plate 60 may be rigidly connected to the mask plate J so that the cam plate and mask plate will be given similar adjustments. Advantageously, and as illustrated, however, the mask plate J and cam plate JA are mechanically connected for simultaneous movements of the two plates in the same direction, but at unequal speeds. As indicated in Figs. 6 and 7, the cam plate 60 is given movements proportioned to the adjustment movements of the mask plate J by means of a gear 61 carried by the shaft 42 smaller in diameter than the gears 44 through which the shaft 43 gives the mask plate its longitudinal adjustments. The gear 61 rotates a larger spur gear 62 through an intermediate idler gear 63. The spur gear 62 is in mesh with a rack bar 64 at the upper side of and attached to the cam plate 60. The number printing box JA is mounted for movement transverse to the adjust-movement of the mask plate on guides 64 mounted on the bottom wall B' of the intermediate printer section.

As the cam plate 60 is adjusted simultaneously with, and in the same direction as the mask plate J, but at a slower speed, the cam plate 60 moves the number box JA transversely of the mask plate by means, which as shown, comprises a cam slot 65 formed in the cam plate, and a pin 65' extending through the slot and rigidly secured to the number printing box. The cam plate 60 is formed with three apertures 66, 67 and 68 displaced from one another both in the direction of the plate movement and in the transverse direction. The number printing box JA is formed with an aperture 69 in its bottom wall. The three cam plate apertures are so relatively arranged that when the mask aperture J$^2$ is in register with the aperture B$^2$, the cam plate aperture 66 is in register with the aperture 69 in the bottom wall of the number printing box JA. When the mask aperture J' is in register with the aperture or exposure orifice B$^2$, as shown in Fig. 6, the aperture 67 is in register with the aperture 69, and when the mask aperture J$^3$ is in register with the aperture B$^2$, the cam plate aperture 68 is in register with the aperture 69 in the bottom wall of the box JA. An opening or openings are formed in the portion of the bottom wall B' beneath the cam plate so that when the opening 69 in the bottom wall of the box JA is in register with any of the cam plate apertures 66, 67 and 68, light can pass from the box JA through its opening 69 onto the subjacent section.

The number printing box JA is shown as generally rectangular in outline and contains a source of printing light 70, shown as an incandescent light bulb mounted in the rear end wall of the box. The light source 70 is in position to illuminate a picture identifying legend carried by the portion of a paper ticket 71, or analogous picture identifying member in register with, and at the outer side of, an orifice 72 in the front end wall of the box JA. Ordinarily, and as indicated, the member 71 is removably received in the holder element 73 attached to the front end wall of the box and formed with a slot open at its upper end for the insertion and removal of identifying members 71 for the different pictures printed. A lens 74 and reflecting prism 75 transmit an image of the identifying legend carried by the member 71 through the orifice 69 in the bottom wall of the box JA, and the cam plate aperture 66, 67 or 68 then in register with the orifice 69. The light thus transmitted to said apertures exposes the film section 36 then in register therewith. A control switch 76 mounted in the box JA is arranged to be closed and opened by the insertion of the member 71 in, and its removal from the slotted holder 73.

The transparency holder F in which the transparency f with an image thereon to be reproduced is held, comprises a mask plate base 80 which includes a cylindrical flange 81 rotatably received in a tubular subjacent portion 82 of the projection printer structure. The mask plate base 80 is angularly adjustable in the member 82 through an angle of 90° about the axis of the flange 81. Axial displacement of the member 80 relative to the member 82 is normally prevented by one or more screws 83 threaded through the member 82 with reduced end portions extending into a groove 84 formed in the peripheral portion of the tubular flange 81. The parts 81 and 82 may be locked together at either end of their 90° relative adjustment by means of a locking pin 85 adapted to enter one or the other of two radial sockets 86 formed in the tubular flange portion 81 of the mask plate base at an annular distance from one another of 90°. As shown in Fig. 13, the pin 85 is spring biased into its locking position and may be retracted by a pull on the knob 87 secured to the outer end of the pin 86. When the pin 85 is retracted, the mask plate base 80 and all of the printer structure above it may be manually turned through an angle of 90°. Such adjustments permit the top of the picture on the transparency to appear, when reproduced, at the side or at one end of the film section 33, 34 or 35 on which the picture is reproduced.

The upper mask base member 80 is formed with a guideway 88 having parallel opposed sides which are grooved to provide a tongue and groove connection between the member 80 and a mask plate 90 removably received in the guideway 88. The mask plate 90 is formed with an aperture 91 which corresponds in size and form to an individual picture portion of the transparency $f$ above the aperture. Advantageously, a plurality, usually three, mask plates 90 are provided for interchangeable mounting in the guideway 88, the interchangeable masks differing only in the dimensions and form of their respective apertures. A second mask plate 92 is connected to the mask plate 90 with freedom for a limited movement relative to the mask plate 90 in the vertical direction. As shown, the connection between the two plates comprises pins 93 having reduced upper ends anchored in the mask plate 92 and each having an intermediate portion received in and axially movable in a vertical passage in the mask plate 90, and having an enlarged lower head received in the counterbored lower end portion of said passage.

Means are provided for raising the pressure plate 92 relative to the mask plate 90 to facilitate the insertion of the transparency $f$ into, and its removal from the space between the pressure plate 92 and mask plate 90. The means, as shown, comprises lifting studs 94 having their upper ends secured to a lifting plate 95 and having their lower ends received in slots 96 extending into the pressure plate from its rear edge. The lifting cam plate 95 is supported at each of its opposite sides by a cooperating pair of cam bars 97 and 98. The cam bars 97 are held against longitudinal movement relative to the lifting plate 95. Each cam bar 98 is beneath and parallel to a corresponding one of the bars 97 and is longitudinally movable to the right as seen in Fig. 11, so that the upper cam edge of the bar 98, and the lower cam edge of the bar 97 cooperate to raise the plate 95. When the cam bars 98 are moved to the left as seen in Fig. 10, the plate 95 is permitted to move downward under the action of gravity. Each cam bar 98 is biased for movement to the left as seen in Fig. 1, by a bias spring 98′ having its right end portion received in a socket 98″ formed in the framework of the projector head section C. The cam bars 98 are given movements in the direction of their length by cams 99 carried by a shaft 100. The latter is journalled in the cam guide parts 101 depending from a supporting plate 102 which is rigidly connected to the portion of the printer housing above the last mentioned plate. Depending vertical studs 103 carried by the plate 102 extend through holes in the lifting plate 95 and prevent horizontal displacement of the latter. The shaft 101 carries a handle 104 for use in rotating the shaft in one direction and thereby giving longitudinal movements to the cam members 98 to raise the pressure plate 92 to facilitate the insertion of a transparency in the space between the mask plate 90 and pressure plate 92 and facilitate the removal of the transparency from said space. The rotation of the shaft 100 in the opposite direction permits the pressure plate 92 to move down into clamping engagement with the transparency.

The transparency carrier is adapted to be given vertical adjustments by the rotation of a subjacent member 105 which is rotatable about the axis of the printer and may be in threaded engagement with a subjacent portion of the housing structure and with said member 80 for the purpose of varying the ratio of enlargement, i. e., the ratio of the size of the reproduction printed on the film $a$ to the size of the transparency picture reproduced, in accordance with the invention disclosed and claimed in the application of Samuel P. Zbell, Ser. No. 730,463, filed February 24, 1947, now Patent No. 2,501,462, issued March 21, 1950, and now in public use, and hence need not be illustrated or described herein.

The optical head portion of the printer includes provisions for removably holding a filter pack 106 in the light path between the condensing lens E and the object lens H. The filter pack 106 is ordinarily used to modify the color of the light transmitted through the transparency to obtain a desirable color balance in printing color pictures. A second filter 107 is mounted in the optical head in the path of the light passing from the light source to the reflecting surface T′. Ordinarily, the filter 107 is employed to correct for variations in sensitivity of the emulsion coatings on different batches of the film $a$.

As previously stated, the housing section B is adjustable relative to the base portion A of the housing body in the horizontal direction transverse to the movement of the film $a$ through the exposure position. The section B is guided in its adjustment movements by a vertical guide plate 108 at one, at least, side of said section. As shown in Fig. 1 there is a guide plate 108 at each of the two sides of the section B. The purpose of the adjustments of the section B is to center the optical system of the printer above one or the other of the three strips or longitudinal sections 30, 31 and 32 of the film $a$. The section B may be interchangeably secured in any of its three adjustment positions by means shown as including a locking bolt 109 extending through a hole in the corresponding side wall of the housing section and into a registering hole in the adjacent guide plate 108. As shown, there is a guide plate 108 and locking bolt 109 at each side of the section B. Each locking bolt may be longitudinally adjusted by a corresponding connecting rod 110 which connects the bolt to a crank disc 111 carried by a shaft journalled in the front wall of the section B and having a hand wheel 112 secured to its outer end. Each guide plate is formed with three holes suitably located to receive the corresponding bolt 109 when the section B is in the appropriate adjustment position.

The general operation of the projection printer disclosed herein, now considered preferable, may be summarized as follows: In reproducing a picture on a transparency $f$, the latter is first properly positioned in the space between the transparency mask plate 90 and clamping plate 92 shown in Fig. 11, after which the plate 92 is lowered to clamp the transparency against the mask plate 90. When the character of the picture to be reproduced and the existing angular adjustment of the projection head portion C of the printer is such as to make a quarter turn adjustment of the section C desirable, the locking pin 87 is pulled out of the socket 85 in which it is then received, and the section C is then manually rotated 90° and the pin 87 is then allowed to move into the second socket 86. In positioning the transparency $f$ in the printer, the operator may, and ordinarily does examine the image reflected by the mirror K' onto the frosted glass window $K^2$ of the viewer K to make sure that the transparency is properly positioned. The appearance of the reflected image on the window $K^2$ may also serve as a guide to the operation in selecting the filter elements to be included in the filter packs 106 and 107 used in reproducing the picture.

After the transparency $f$ is properly positioned and secured in place, and any desired adjustment in the light filters and in the hereinafter mentioned exposure timing mechanism have been made, a ticket or other member 71 carrying the identifying number for the picture to be reproduced is manually inserted in the holder 73, after which a starting button or the like is actuated to initiate an exposure period. The insertion of the ticket 71 in the holder 73 closes the normally open switch 76 in the box JA, and thereby effects the small advancement of the film $a$ required to provide the film section 36 on which the identifying number for the picture will eventually be printed. The termination of the exposure period is followed by the advancement of the film $a$ required to move the section 33, 34 or 35 of the film exposed during said period, out of the printing position, and to move a new similar section of the film into the printing position. Each such film advancement is terminated by the closure of the appropriate one of the switches 25, 26 and 27. The lamp 70 in the number printer box JA is next energized for the brief period required for the number printing operation and concludes the operation of printing a single reproduction of the picture on the transparency $f$ in the printer.

When more than a single reproduction of the picture on the transparency $f$ in the printer is desired, an adjustment of a selector or series printer controller, is made preparatory to the actuation of the starting button which initiates the first exposure. That adjustment does not modify the operation of the printer in printing the first reproduction of the picture on a transparency $f$ inserted in the printer, but thereafter causes the printer to alternately expose and advance successive sections 33, 34 or 35 of the film $a$, until the desired number of reproductions of the picture have been determined by the selector switch adjustment.

The operation of the printer in the general manner and for the purposes previously mentioned and hereinafter described in greater detail, is advantageously effected and controlled by a suitable automatic control system. The latter may take various forms, one simple form being shown, by way of example, in Fig. 15. The system shown in Fig. 15 includes the previously mentioned switches 24, 25, 26, 27, 28, 29, 57a, 57b, 57c and 76, and windings 7a and Xa of the relays 7 and X'. Other control elements shown in Fig. 15 include a starting button 119 included in an exposure timing mechanism 120, the relay 121 opening and closing the shutter I, a switch 122 opened and closed by the shutter mechanism I as the shutter is opened and closed, a selector or series printing controller mechanism 124, a relay 125 controlling the energization of the number printing lamp 70, and cooperating with the exposure timing mechanism and a special film advancing switch 194. The exposure timing mechanism 120 includes a timer unit 120a which directly controls the duration of each exposure. While the timing unit may take any one of various known and suitable forms, I prefer in practice to use a timing mechanism of the character disclosed and claimed in the prior application of Jacob Rabinowitz, Serial No. 594,403, filed May 18, 1945, now Patent No. 2,469,076, issued May 3, 1949, and also disclosed in a modified form in the application of Jacob Rabinowitz, Serial No. 710,251, filed November 16, 1946, now Patent No. 2,448,736, issued September 7, 1948.

The timing mechanism disclosed in said Rabinowitz applications includes a photoelectric cell and a condenser associated to form a timing unit which is responsive to the amount of printing light transmitted through the transparent picture being reproduced, and which operates to deenergize a winding corresponding to the winding 133 hereof, after an exposure period which is dependent on the average light transmitting capacity of said picture. As diagrammatically shown in Fig. 15, the winding 133 is included in an energizing circuit in series with a source of current, a normally closed switch momentarily opened by the depression of a starting push button 119, the timing unit 120A and a switch 193 controlled by the relay 124 and opening only when the latter is energized. Each printing operation is initiated by the momentary depression of the push button 119. In a series printing operation, each exposure subsequent to the initial exposure is initiated by a momentary energization of the relay 124 which momentarily opens the energizing circuit for the winding 133. During each exposure period, the winding 133 remains deenergized but is reenergized through the action of the timing unit 120a at the end of the period.

In the particular form shown diagrammatically in Fig. 15, alternating current is furnished by supply conductors AC' and $AC^2$. The relay 121 which actuates the shutter I has one terminal conductor 126 connected to the supply conductor $AC^2$, and has a second terminal conductor 127 connected to the automatic timing mechanism 120. The latter has energizing terminals 128 and 129 connected to the supply conductor AC' and $AC^2$, respectively. The timing mechanism 120 operates to energize and deenergize the shutter relay 121 by connecting its terminal conductor 127 to, and disconnecting it from the conductor 128 in some known or suitable manner.

The mechanism 120 includes a movable contact 130 which is biased for movement into engagement with a stationary contact 131, and is moved out of engagement with the latter and into engagement with a second stationary contact 132 on the energization of a relay winding 133. The stationary contact 131 is shown as connected to the terminal conductor 127 of the shutter relay 121. The movable contact 130 is connected by a conductor 135 to the conductor 128 and thereby to the supply conductor AC'. The stationary contact 132 is connected by a conductor 136 to the stationary contact of the shutter actuated switch 122. The winding 133 is deenergized, and thereby caused to energize the relay 122 to open the shutter I, by the actuation of the push button in single picture printing operation the winding 133 is deenergized and the shutter I opened by means of a timing device 120A at the end of each film advancing action which follows a film exposure.

The switch 122 has its movable contact connected by conductor 136' to a movable contact 137 of the relay switch 123. The contact 137 is biased for engagement with a stationary contact 138, and is moved out of engagement with the contact 138 and into engagement with a second stationary contact 139 when the winding 140 of relay 123 is energized.

The relay winding 140 has one end connected by a conductor 141 to the supply conductor AC', and has its second end connected to the contact 139 and to a conductor 142. The conductor 142 is connected through parallel branches 143 to the three normally open switches 25, 26 and 27. The second terminal of the switch 25 is connected to one terminal of the switch 57a. The second terminals of the switches 26 and 27 are respectively connected to the terminals of switches 57b and 57c when the latter is closed by the projection 58 as is shown in Fig. 15, in which the mask plate aperture $J^2$ is assumed to be in register with the orifice $B^2$. The second terminals of switches 57a, 57b and 57c are connected to branches 144 of a conductor 145, and are thereby connected to the movable switch control 137. As shown in Fig. 15 the pin 58 carried by the mask plate J is in the position in which it closes the switch 57b.

The closure of the switch 25, 26 or 27 in series with the particular switch 57a, 57b or 57c which is then closed by the mask plate pin 58, connects the conductor 142 to the conductor 145. The connection of conductors 142 and 145 energizes the winding 140 which, as hereinafter explained, is normally deenergized at the instant at which the conductors 142 and 145 are connected. The energizing circuit for the winding 140 which is established when the conductors 142 and 145 are connected, includes the conductor 141 through which one terminal of the winding 140 is connected to the conductor $AC^2$ and includes the conductor 136' connecting the conductor 145 to one terminal of the switch 122, the conductor 136 connecting the switch 122 to the stationary contact 132 of the mechanism 120, the associated movable contact 130 and the conductors 135 and 128 which connect the contact 130 to supply conductor AC'. The energization of the winding 140 pulls the contact 137 into engagement with the contact 139 of the relay switch 123 and thereby connects the contact 137 to the supply conductors $AC^2$ through the relay winding 140 whereby the energization of the winding 140 is maintained following the disconnection of the momentarily connected conductors 142 and 145.

In each printing operation the windings 7a and Xa are first energized and then deenergized in the initial portion of the operation to advance the film a through the small distance required to provide a section 36 on which the identifying number of the picture being reproduced, may be printed, by control means including the normally open switch 24 and the ticket actuated switch 76. The windings 7a and Xa are energized during a later portion of each printing operation to effect the advancement of one or more film sections 33, 34 or 35, accordingly, as the printing operation produces a single reproduction, or a series of reproductions of the picture on the transparency f in the printer. Each of the last mentioned film advancing operations is initiated by the closure of the switch 122 at the end of the immediately preceding exposure period.

Each of the windings 7a and Xa has one terminal connected by a conductor 146, a normally closed switch 29 and a conductor 147 to the supply conductor $AC^2$, and has its second terminal connected by a conductor 148 to the stationary switch contact 138 of the relay switch 123, and to a movable switch contact 149. The latter is biased for movement into engagement with a stationary abutment 150, but is held out of engagement with said abutment and into engagement with a stationary contact 151 when the winding 140 is energized. The contact 151 is connected by a conductor 152 to a stationary contact 153. A movable contact 154 is biased for engagement with the contact 153 and is connected by a conductor 155 to one terminal of the switch 76 which has its second terminal connected to the supply conductor AC'. The switch 76 is self-opening but is closed throughout each period in which a number ticket 71 is held in the holder 72 attached to the number printer box JA. The movable contact 154 is moved out of engagement with the contact 153 and into engagement with a stationary contact 156 when an associated coil 157 is energized.

In regular operation the winding 140 is energized by the momentary closure of one of the switches 25, 26 and 27 in the final portion of each printing operation and is still energized during the initial portion of each subsequent printing operation, which is initiated by the closure of the switch 76, effected when a ticket 71 is inserted in the holder 73. The closure of the switch 76 energizes the windings 7a and Xa through a circuit including the supply conductor AC', switch 76, contacts 154 and 153, conductor 152, contacts 151 and 149, conductor 148, conductor 146, normally closed switch 29 and conductors 147 and $AC^2$. The energization of the windings 7a and Xa which is initiated by the closure of the switch 76, is terminated by the closure of the switch 24. The latter has one terminal connected by conductor 158 to supply conductor AC', and has its second terminal connected by conductor 158' to one terminal of the winding 157 and to the stationary contact 156. The second terminal of the winding is connected by a conductor 159 to the supply conductor $AC^2$. The energization of the winding 157 effected when the switch 24 is normally closed, pulls the movable contact 154 out of engagement with the stationary contact 153 and into engagement with the stationary contact 156. The movement of the contact 154 out of engagement with the contact 153 opens the previously established energizing circuit for the windings 7a and Xa and establishes a second energizing circuit for the winding 156 by connecting that winding to the supply conductor AC' through the contacts 156 and 154 and switch 76. In consequence, the energization of the winding 157, momentarily established by the switch 24, is thereafter maintained through the switch 76 until the completion of the printing operation and the removal of the ticket 71 from the holder 73.

In normal operation, the energization of the winding 157 and its above-described results, are followed by an exposure period which is initiated by the actuation of the push button 119 which deenergizes winding 133. Thereupon the contact 130 is moved by its bias force into engagement with the contact 131, and thus energizes the relay 121, and opens the shutter I and switch 122. The opening of the switch 122 interrupts the energizing circuit for the winding 140 and permits the movable contact 137 to move under its bias force into engagement with the contact 138, but that engagement does not immediately energize the windings 7a and Xa since the switch 122 is then open. However, on the closure of switch 122 at the end of the exposure period, the windings 7a and Xa are energized through a circuit including the conductors 148, contacts 138 and 137 and the connection including the switch 122 between the contact 137 and the supply conductor AC'. Such energization of the windings 7a and Xa effects the advancement of the appropriate section 33, 34, or 35 of the film a, which is terminated by the closure of the corresponding switch 25, 26 or 27 in series with whichever of the switches 57a, 57b or 57c is then closed by the pin 58 carried by the mask plate J. The energizing current flow through the winding 140 which occurs when the conductors 142 and 145 are thus connected, draws the contact 137 out of engagement with the contact 138 and thus interrupts the energization of the windings 7a and Xa and thereby terminates the printing operation initiated when the ticket 71 was inserted in the holder 73, if that operation is a single printing operation. However, when the operation is a series printing operation, the adjustment of the controller 125 made preparatory to the initiation of said printing operation, the last mentioned deenergization of the windings 7a and Xa, will be followed by one or more subsequent film exposures, each followed by the advancement of a film section 33, 34 or 35, until the number of all of the reproductions required by the adjustment previously given the series printing controller 125 have been made.

In a single printing operation, the termination of the single film feeding movement when terminated by the closure of one or another of the switches 25, 26 and 27, and in a series printing operation of the first film feeding movement so terminated, results in the energization of the lamp 70 in the number printer box JA, and the printing on the previously advanced section 36 of the film a of the number or other identification matter on the card 71 then in the holder 73. This number printing operation is effected with the arrangement diagrammatically shown in Fig. 15, by the momentary energization of the relay 124. That relay has one terminal connected by conductor 161 to the supply conductor AC', and has its second terminal connected by a conductor 162 to a stationary contact 163. A movable contact 164 connected by a conductor 165 to the conductor 129 and thereby to the conductor AC² is biased for movement into engagement with a stationary stop 166, but is drawn into engagement with the stationary contact 168 when current flows through a relay winding 167. The latter is connected in series between two sections of the conductor 145, and current flows through the winding 167, and thereby effects the energization of the relay 124, whenever the momentary closure of one or another of the switches 25, 26 and 27, establishes a conductive connection between the conductors 144 and 142.

The relay 124 may be of the known, commercially available type called an Agastat relay, or of some type similar thereto, in that it is adapted when momentarily energized to close a circuit and to keep said circuit closed for a short predetermined period which is not terminated until after the deenergization. The energization of the relay 124 closes an energizing circuit for the lamp 70 which has one terminal connected to the supply conductor AC' through its branch 129, and has its second terminal connected by a conductor 168 to a movable contact 169 which is biased for engagement with a stationary stop 170 but is pulled out of engagement with that stop and into engagement with a stationary contact 171 by the energization of the relay 124. The stationary contact 171 is connected by a conductor 172 to a contact 173 normally connected by a bridging switch arm contact 174 to a contact 175 which is connected by a conductor 176 to the supply conductor AC².

With the bridging contact 174 in its normal position in which it engages and connects the contacts 173 and 175, the momentary engagement of the contact 164 with the stationary contact 163 energizes the relay 124, and thus closes the energizing circuit for the lamp 70. Because of its special characteristics, the relay 124 is adapted to maintain the energization of the lamp for a brief period, ordinarily only a fraction of a second, required for the printing of the identifying number on the film section 36 through the aperture 69 in the bottom wall of the number box, and the aperture 66, 67 or 68 then in register with the aperture 69.

As will be apparent, every feeding movement of the rack bar 9 which is interrupted by the closure of one or another of the switches 25, 26 and 27, will effect an energization of the relay 124. However, in the preferred mode of operation of the apparatus disclosed, the lamp 70 should be energized to effect a number printing operation in series printing only following the printing of the first reproduction of the series of reproductions made from a single transparency. With the arrangement shown, the energization of the relay 124 can result in a number printing operation only when the bridging contact 174 connects the conductors 172 and 176. In the form of the invention shown in Fig. 15, the bridging contact 174 is moved to open the lamp energizing circuit at the conclusion of the first printing operation of a series of such operations by an adjustable element 180 of the series printing controller 125.

As diagrammatically illustrated, the bridging contact 174 is carried by the switch lever 177 pivoted at 177' and biased for clockwise movement into engagement with a stationary stop 178 in which it holds the bridge contact 174 out of engagement with the contacts 173 and 175. During any single printing operation the switch lever 177 is held in the position in which its bridging contact 174 engages and connects contacts 173 and 175, by a cam part 179. The latter forms part of a rotatable structure including a shaft 180 which carries and rotates a ratchet wheel 181 with peripheral teeth 182 and a pointer or index 183. The latter operates with scale marks 1, 2, 3–22 on a stationary scale 184 to indicate the angular adjustment of the rotatable structure away from a neutral or normal position shown in Fig. 1 and in Fig. 15, in which the pointer is in register with the scale mark 1. As shown, the cam part 179 is secured to the ratchet wheel 181 and cooperates with a stationary stop arm 185 to prevent clockwise rotation of the ratchet wheel away from its neutral position. As shown by way of example, the ratchet wheel has 24 teeth, but with the particular arrangement of the stop parts 178 and 185, the maximum counterclockwise movement of the ratchet wheel is equal to the angular span of 22 teeth 182.

A counter-clockwise, single tooth adjustment of the ratchet wheel away from its neutral position which, moves the pointer into register with the scale mark 2, moves the cam part 179 out of the position in which it interferes with the movement of the switch lever 177 into engagement with the stop 178.

Immediate movement of the switch lever 177 is then prevented, however, by a latch lever 186 which is biased to its position shown in Fig. 15, in which the latch lever hook engages a projection 177" from the lever 177, and holds the latter in the position shown in Fig. 15 in which the conductors 172 and 176 are connected. Each counter-clockwise angular adjustment of the ratchet wheel 181, preparatory to a series printing operation, is that required to bring the pointer 183 into register with the scale number which is the same as the number of pictures to be printed. Following the printing of each of the pictures printed in the series printing operation, the ratchet wheel 181 is given a one tooth, clockwise return movement. The initial single step return movement of the ratchet wheel turns the latch lever 186 clockwise to disengage the projection 177" and thus permits the switch lever 177 to move into its open position.

The latch lever 186 is thus caused to release the lever 177, by a latch release lever 187 pivoted at 187' and biased into its position shown in Fig. 15. The lever 187 is turned counter-clockwise out of its biased position on each clockwise movement of the ratchet wheel 181, by the tooth 182 which is at the left of the lower end of the lever 187 when said ratchet wheel movement begins. When the lever 177 turns clockwise into its open position, its projection 177" moves into the position in which it engages the outer end surface of the hook portion of the latch lever 186 and thus holds the latter against a return or counter-clockwise movement until the switch lever 177 is returned to its closed position by the cam 179. While the latch lever 186 is thus held in an inoperative position, counter-clockwise adjustments of the release lever 187, resulting from single step return movements of the ratchet wheel to its neutral position, have no operative effect on the latch lever.

During a series printing operation, the film advancing movement of the rack bar 9 which follows the completion of each exposure, momentarily closes the switch 28 and thereby momentarily energizes the winding of an electromagnetic relay 188, which has its winding connected across the conductors AC' and AC² in series with the switch 28. While the ratchet wheel 181 is out of its normal position, each such energization gives the ratchet wheel a one tooth angular adjustment in the clockwise direction. Such clockwise adjustments are repeated until the ratchet wheel is returned to its neutral position. The energization of the relay 188 advances the ratchet wheel by giving a counter-clockwise adjustment to a ratchet lever 189 pivoted at 189' and having a pawl 180 pivoted to its other end. Intermediate its ends the lever 189 is connected to the armature 188' of the relay 188. Each counter-clockwise adjustment of the lever 189 moves the pawl 180 into engagement with the adjacent tooth 182 of the wheel 181, and gives the latter a one tooth angular advance. The lever 189 is biased for movement into the position in which the pawl 180 is held outside of the path of the teeth 182 by a stationary pin 189. As shown, a positioning lever 191 pivoted at 191 and carrying an anti-friction roller, is biased to move said roller into the space between two adjacent teeth 182. The lever 191 thus prevents accidental displacement of the ratchet wheel, and insures that each angular adjustment of the ratchet wheel terminates with the pointer 183 in accurate register with the appropriate scale mark. As diagrammatically shown, the various lever elements of the controller 125 are biased as above described by bias springs 125'.

While the switch lever 177 and ratchet wheel 181 cooperate to prevent the relay 124 from energizing the number printing lamp 70 more than once during each series printing operation, the relay 124 is used to open the shutter I and initiate an exposure after the movement out of the exposure position of each except the last of the film sections 33, 34 and 35 exposed during a series printing operation. As shown, this result is obtained by means of a switch in the energizing circuit for the winding 133 which is opened by the relay 124 on each energization of the latter. Said switch comprises a stationary contact 192 and a movable contact 193 which is biased for engagement with said stationary contact, but is pulled out of such engagement on each energization of the relay 124. The contacts 192 and 193 are included in the energizing circuit for the winding 133 and their separation deenergizes the winding 133, and thereby effects an engagement of the movable contact 130 with the stationary contact 131. The engagement of those contacts closes the energizing circuit for the shutter opening relay 121 which comprises the conductors AC', 129 and 135, the contact 130 and 131, and conductors 127, 126 and AC².

It is sometimes desirable to effect an advancement of the film for some special purpose. One such purpose is to avoid printing an identifying number or a portion of a relatively small picture on a previously exposed film section 33 or 34 when following the exposure of that section, the mask plate J is adjusted to expose a larger film section. In such case the next section 36 exposed will, and a portion of the large film section next exposed may, overlap the small film section exposed immediately prior to the mask plate adjustment. While it is possible to provide automatic means operative to avoid such double exposure of overlapped film sections, such double exposure may be readily avoided in a simple manner by providing manually controlled means for briefly energizing the relays 7a and Xa whenever such energization is desired. Thus, as shown in Fig. 1, a normally open switch 194 is so arranged that when manually closed it will connect the conductor 148 to the supply conductor AC' and thus energizes both windings 7a and Xa. The film movement effected by a closure of the switch 194 may be varied by varying the time in which the switch 194 is closed. However, the switch 29 will prevent a prolonged closure of the switch 194 from causing a film advancement appreciably greater than that produced when the largest mask plate aperture J3 is in register with the aperture B².

The various switches 24—28 and 57a, 57b and 57c, may well be of the commercially available, normally open, Microswitch type. However, the switch 29 is advantageously of a type, also commercially available which is normally closed and which when opened is locked in its open position so that it must be manually adjusted or reset by pressing the release button 29', shown in Fig. 4, to return the valve to its closed condition. The use of a valve 29 of the special type mentioned is desirable since in regular operation the switch 29 is closed only when one of the switches 24—28 becomes inoperative, or some other apparatus defect develops which necessitates repair or readjustment of the apparatus.

In practice the hereinbefore mentioned push button switches and also other control apparatus may well be mounted on top of the housing section A on the panel 37 as seen in Fig. 1, generally as is shown in my above-mentioned prior application, and it seems unnecessary to illustrate or to refer in greater detail herein to the mounting of such control apparatus.

In printing reproductions of a transparency picture on film sections 34 and 35, the difference in the size of those sections is too small to necessitate any difference in the optical system, enlargement ratio or factor employed. However, a different enlargement ratio or factor is needed when the picture is printed on the small film section 33 than when the picture is printed on either of the larger film sections 34 and 35. The required change in the enlargement ratio needed in such case is obtained by giving the member 105 a predetermined angular adjustment. Such angular adjustment of the member 105 effects similar adjustments of the transparency and object lens H toward and away from the portion of the film $a$ above the support L, and gives an additional adjustment of the transparency $f$ toward or away from the film section which is not shared by the lens H. The manner in which the adjustment of the transparency and object lens are effected is fully disclosed in the above mentioned application of Samuel Zbell.

As diagrammatically shown in Fig. 15, and as has been described, the electric elements of the apparatus disclosed are energized by alternating current. As those skilled in the art will recognize, however, the supply conductors AC' and AC$^2$ may be connected to a source of direct current of suitable voltage, and some of the apparatus shown in Fig. 15 may be energized by alternating current supplied by conductors AC' and AC$^2$ and the remainder of the apparatus may be energized by direct current.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. An optical projection printer adapted to successively print a plurality of pictures on each of a plurality of side by side longitudinal sections of a strip of photographic material, comprising in combination a housing structure enclosing a film chamber, film supporting and advancing means mounted in said chamber and operative to intermittently move successive sections of said film into an exposure position, a projector device comprising a transparency seat and a projection lens and having an optical axis and mounted on said structure for bodily movement transversely to the direction of movement of said strip through positions in which the optical axis of said projector device intersects the different sections of said strip, and positioning means comprising cooperating elements of said structure and projector device for maintaining said device in one or another of predetermined positions in which the optical axis of said device intersets a predetermined one or another of said sections preparatory to the printing of pictures on a selected one of said sections.

2. A projection printer as specified in claim 1, which includes a supply roll and a take-up roll, and in which the means for intermittently advancing the strip material is normally operative to draw said strip from said supply roll and to cause the strip to be wound upon said take-up roll and in which said printer includes means operable following the printing of pictures on one of said sections and preparatory to the printing of pictures on another of said sections of said strip of photographic material to rotate said supply roll in the direction to draw film from the take-up roll and rewind it on said supply roll.

3. A projection printer as specified in claim 1, which comprises a framework including a base section and a projection section, and in which the means for intermittently advancing said strip material includes supply and take-up spools for said strip material and is mounted in said base section, and in which said projector device is mounted on said base section for adjustment in a direction transverse to the direction of movement through said exposure position of said strip material into operative relation with one or another of said strip material sections, and in which said projectior device comprises a projector head portion including a transparency holder and an optical system for projecting light through a transparency in said holder to the portion of said strip material section in said exposure position, and means for rotating said projector head about the axis of said optical system through an angle of 90°, and an image viewer mounted in said projector device and comprising a window and a mirror movable into and out of a position in which it is intersected by said axis and reflects an image borne by said transparency to said window.

4. A projection printing for successively printing pictures on successive longitudinal sections of sensitized strip material comprising a projection lens and having a fixed optical axis, intermittently operating feed mechanism for successively moving successive sections of said strip material in one predetermined direction through an exposure position, mask plate means having a plurality of apertures of different sizes arranged in a row extending in a direction transverse to the first mentioned direction, and selectively operable means for adjusting said mask plate means in a direction transverse to the first mentioned direction to move any selected one of said apertures into register with said exposure position intersected by said axis, and means controlled by the adjustment of said mask plate means to make the extent of each strip feeding movement dependent on the size of the mask plate aperture through which the next picture is to be printed.

5. A projection printer for successively printing pictures on successive longitudinal sections of sensitized strip material comprising intermittently operating feed mechanism for successively moving successive sections of said strip material in one predetermined direction through an exposure position, mask plate means having a plurality of apertures of different sizes arranged in a row extending in a direction transverse to the first mentioned direction, and selectively operable means for adjusting said mask plate means in a direction transverse to the first mentioned direction transversely to the length of said strip material to move any selected one of said apertures into register with said exposure position, and means controlled by the adjustment position of said mask plate means to make the extent of each strip feeding movement dependent on the size of the mask plate aperture through which the next picture is to be printed, and picture identifying means for printing identifying data on a section of the strip between the strip section on which the picture thereby identified is to be printed and the adjacent portion of the strip on which another picture is printed, and mechanism through which the adjustment of said mask plate adjusts said identifying means in the direction of movement of said strip material through the exposure position and thereby compensates for variations in the size of the pictures printed.

6. A projection printer adapted to print pictures on successively exposed longitudinal portions of a strip of sensitized material as said portions are successively moved into an exposure position, mask means adjustable to make the lengths of said exposed portions variable, an intermittently rotating measuring roller for advancing said material in proportion to the extent of each rotative movement, and mechanism for regulating the extent of each intermittent rotative movement given said measuring roll comprising a toothed gear connected to said roll for rotation therewith, a rack bar extending transversely to said roll and movable in the direction of its length toward and away from an initial position and biased for movement into said position and movable transversely to its length into and out of a second position in which it extends tangentially to said gear and has its teeth in mesh with the gear teeth, the rotation of said gear while in engagement with said rack bar moving the latter away from its initial position for a distance corresponding to the extent of rotation of the roll, and mechanism operable to move said rack bar into and out of said second position to initiate and terminate measuring roll rotative movements and including holding means preventing rotative movement of said measuring roll while said rack bar is out of said second position.

7. A projection printer adapted to print pictures on successively exposed longitudinal portions of a strip of sensitized material as said portions are successively moved into an exposure position, mask means adjustable to make the lengths of said exposed portions variable, an intermittently rotating measuring roller for advancing said material in proportion to the extent of each rotative movement, and mechanism for regulating the extent of each intermittent rotative movement given said measuring roll, comprising a toothed gear connected to said roll for rotation therewith, a rack bar extending transversely to said roll and movable in the direction of its length toward and away from an intial position and biased for movement into said position and movable transversely to its length into and out of a second position in which it extends tangentially to said gear and has its teeth in mesh with the gear teeth, the rotation of said gear while in engagement with said rack bar moving the latter away from its initial position for a distance corresponding to the extent of rotation of the roll, and mechanism selectively operable to initiate and terminate measuring roll rotative movements of different predetermined extents, comprising means operable in one sense to move said rack bar into and out of said second position and operable in the opposite sense to move said rack bar out of said second position, and adjustable control means including means responsive to the extent of movement of said rack bar away from its initial position for operating said member in the opposite sense after a movement of said bar away from its initial position of an extent predetermined by the adjustment of said control means.

8. A projection printer adapted to print pictures on successively exposed longitudinal portions of a strip of sensitized material as said portions are successively moved into an exposure position, mask means adjustable to make the lengths of said exposed portions variable, an intermittently rotating measuring roller for advancing said material in proportion to the extent of each rotative movement, and mechanism for regulating the extent of each intermittent rotative movement given said measuring roll by said member comprising a toothed gear connected to said roll for rotation therewith, a rack bar extending transversely to said roll and movable in the direction of its length toward and away from an initial position and biased for movement into said position and movable transversely to its length into and out of a second position in which it extends tangentially to said gear and has its teeth in mesh with the gear teeth, the rotation of said gear while in engagement with said rack bar moving the latter away from its initial position for a distance corresponding to the extent of rotation of the roll, and adjustable mechanism operable to move said rack bar into said second position to initiate a measuring roll rotative movement and including means actuated by the resultant movement of said rack bar away from said initial position to move said rack bar out of said second position after an extent of said movement dependent on the adjustment of said adjustable mechanism.

9. A projection printer adapted to print pictures on successively exposed longitudinal portions of a strip of sensitized material as said portions are successively moved into an exposure position, mask means adjustable to make the lengths of said exposed portions variable, an intermittently rotating measuring roller for advancing said material in proportion to the extent of each rotative movement, a yielding drive connection to said roll intermittently rotating the latter, and mechanism for regulating the extent of each intermittent rotative movement given said measuring roll by said member comprising a toothed gear connected to said roll for rotation therewith, a locking element movable into and out of engagement with said roll and holding said roll against rotation while in engagement therewith, a rack bar extending transversely to said roll and movable in the direction of its length toward and away from an initial position and biased for movement into said position and movable transversely to its length into and out of a second position in which it extends tangentially to said gear and has its teeth in mesh with the gear teeth, said locking element and rack bar being interlocked for operative engagement of said element and roll during periods alternating with those in which said rack bar and gear wheel teeth are in mesh, the rotation of said gear while in engagement with said rack bar moving the latter away from its initial position for a distance corresponding to the extent of rotation of the roll, and means selectively operable to move said rack bar into and out of said second position to initiate and terminate a measuring roll rotative movement of regulable extent.

10. A projection printer adapted to print pictures on successively exposed longitudinal portions of a strip of sensitized material as said portions are successively moved into an exposure position, mask means adjustable to make the lengths of said exposed portions variable, an intermittently rotating measuring roller for advancing said material in proportion to the extent of each rotative movement, a yielding drive connection through which said member tends to rotate said measuring roll continuously during each rotative movement of said driving member, and mechanism for regulating the extent of each intermittent rotative movement of said measuring roll comprising a toothed gear connected to said roll for rotation therewith, a locking element movable into and out of engagement with said roll and holding said roll against rotation while in engagement therewith, a rack bar extending transversely to said roll and movable in the direction of its length toward and away from an initial position and biased for movement into said position and movable transversely to its length into and out of a second position in which it extends tangentially to said gear and has its teeth in mesh with the teeth of said spur gear, and means interlocking said locking element and rack bar for operative engagement of said element and roll during periods alternating with those in which said rack bar and gear wheel teeth are in mesh, the rotation of said gear while in engagement with said rack bar moving the latter away from its initial position for a distance corresponding to the extent of rotation of the roll.

11. A projection printer adapted to print pictures on successively exposed longitudinal portions of a strip of sensitized material as said portions are successively moved into an exposure position, mask means adjustable to make the lengths of said exposed portions variable, an intermittently rotating measuring roll for advancing said material in proportion to the extent of each rotative movement, a toothed gear connected to, and rotating with said roll, a rack bar longitudinally movable into and out of an initial position and movable transversely to its length into and out of a second position in which said rack bar has its teeth in mesh with the teeth of said gear wheel so that while the rack bar is in said second position, the rotative movement of said roll will effect a longitudinal adjustment of the rack bar proportional to the extent of said rotative movement, a plurality of control switches, switch actuating means carried by said rack bar and adapted to engage and successively actuate said switches as the rack bar is moved away from its neutral position by said rotatable gear, and control means adjustable to render one or another of said switches operative when actuated to move said rack bar out of said second position.

12. A projection printer as specified in claim 11, including mask means adjustable to vary the sizes of the pictures printed and including means through which the adjustment of said mask means adjusts said control means to render one or another of said switches operative.

13. A projection printer for successively printing pictures on successive longitudinal sections of sensitized strip material, comprising intermittently operable feeding mechanism feeding successive sections of the strip material into an exposure position in successive feeding operations, a mask plate having a plurality of apertures of different sizes and adjustable to move any selected one of said apertures into register with said exposure position, a corresponding plurality of control switches, each operatively related to said mask plate so that the adjustment of the latter which moves any one of said apertures into register with said exposure position effects an operative adjustment of a corresponding one of said switches, and means controlled by each switch when so adjusted to make the extent of a subsequent feeding movement of the strip material dependent on the size of the last mentioned aperture.

14. A projection printer for successively printing pictures on successive longitudinal sections of sensitized strip material, comprising feed mechanism operating intermittently to feed successive sections of the strip material in one predetermined direction through an exposure position, mask plate means having a plurality of apertures of different sizes arranged in a row extending in a direction transverse to the first mentioned direction, and selectively operable means for adjusting said mask plate means in a direction transverse to the first mentioned direction, mechanism including control switches cooperating with said mask plate means to make the length of the material section fed into said exposure position for exposure through each aperture dependent upon the size of said aperture, a printer unit for printing identifying data for a picture to be printed on a portion of said material between a previously exposed portion of the material and the portion of said material on which said picture is to be printed, and an operative connection between said mask plate and said printer unit for adjusting the latter in accordance with the length of the picture to be printed.

15. A projection printer as specified in claim 14 normally operative to print a different picture in each successive printing operation, but including normally inoperative series printing means adapted to be rendered operative to print a plurality of similar pictures, and means actuated by said series printing means to prevent said unit from printing identifying data on the strip material between any two adjacent sections thereof on which any two of said plurality of pictures is printed.

16. A projection printer for successively printing pictures on successive longitudinal sections of sensitized strip material comprising intermittently operating feed mechanism for successively moving successive sections of said strip material in one predetermined direction through an exposure position, mask plate means having a plurality of apertures of different sizes arranged in a row extending in a direction transverse to the first mentioned direction, and selectively operable means for adjusting said mask plate means in a direction transverse to the first mentioned direction to move any selected one of said apertures into register with said exposure position, and means controlled by the adjustment of said mask plate means to make the extent of each strip feeding movement dependent on the size of the mask plate aperture through which the next picture is to be printed, a printing unit for printing identifying data on said material adjacent each picture printed, and common adjusting means for adjusting said mask plate means transversely of the direction of material movement to bring one or another of said apertures in register with said exposure position and for adjusting said unit in the direction of material movement into a position predetermined by the adjustment of said mask plate means.

17. A projection printer adapted to successively print pictures of different sizes on successive longitudinal portions of a strip of sensitized material, comprising mask means adjustable to make the lengths of said exposed portions variable, feeding mechanism for intermittently advancing said strip through an exposure position including a rotatable measuring roll for advancing said material in proportion to its rotative movement, means for intermittently rotating said roll, a toothed gear connected to said roll for rotation therewith, a guide member pivoted to turn about an axis parallel to and laterally displaced from said roll, a rack bar mounted in said guide member for movement toward and away from said axis and moved into and out of a position of engagement with said gear by movement of said guide member about said axis, holding means actuated by said guide member on movement of said rack bar out of engagement with said gear to engage said measuring roll and interrupt its rotation, and control means responsive to the extent of movement of said rack bar away from said axis for turning said guide member about said axis to separate said rack bar and gear after a rotative movement of the roll proportional to the size of the picture next to be printed.

18. A projection printer adapted to reproduce transparency pictures in successive printing operations on sections of a strip of sensitized material successively moved through an exposure position, comprising in combination a feeding mechanism for intermittently advancing said strip material, exposure mechanism operable to intermittently transmit light through a transparency picture to a film section then occupying an exposure position, and automatic actuating mechanism for sequentially operating said feeding and exposure mechanisms to print pictures on successive portions of said strip and to print picture identifying data on portions of said strip alternating with the first mentioned portions and including feeding mechanism adjusting means operable to vary the lengths of the first mentioned portions of said strip and including means for initiating a printing operation and operating said feeding mechanism to effect an initial advancement of said strip material to provide a data section between a previously exposed section of said material and the section of said material to be exposed during the printing operation, means operating said feeding mechanism on the termination of the initial feeding operation to effect a second advancement of the strip material and thereby move into the exposure position the section of the latter on which a picture is to be printed in the printing operation, means operating said exposure mechanism on the termination of said second material advancing operation to thereby print a reproduction of the transparency picture on the strip material section in said exposure position, and means actuated on the termination of said exposure to print picture identifying data on said data section.

19. A projection printer as specified in claim 18, including means for adjusting said automatic actuating mechanism to successively reproduce a single transparency picture on a plurality of sections of said strip material following the initiation of the series printing operation and the initial operation of the feeding mechanism to advance a data section of the strip material, including means automatically actuated to operate said feeding mechanism and said exposure mechanism alternately to advance and expose the said sections on which pictures are printed without operating said feeding mechanism to advance data sections of said material until said predetermined plurality of said pictures have been printed.

LEO PAVELLE.

REFERENCES CITED

The following references are of record in the file of this patent:

UNITED STATES PATENTS

| Number | Name | Date |
|---|---|---|
| 1,109,077 | Lockyer | Sept. 1, 1914 |
| 1,841,811 | Hershberg | Jan. 19, 1932 |
| 1,847,531 | Kesses | Mar. 1, 1932 |
| 1,894,004 | Rose | Jan. 10, 1933 |
| 1,898,905 | Seitz | Feb. 21, 1933 |
| 2,035,558 | Lloyd | Mar. 31, 1936 |
| 2,336,279 | Mihalyi | Dec. 7, 1943 |
| 2,364,188 | Bryce | Dec. 5, 1944 |
| 2,369,897 | Hjort | Feb. 20, 1945 |
| 2,415,424 | Gaebel | Feb. 11, 1947 |

FOREIGN PATENTS

| Number | Country | Date |
|---|---|---|
| 174,622 | Great Britain | June 25, 1923 |